US012698745B2

(12) United States Patent　　　　(10) Patent No.:　US 12,698,745 B2

Bailey et al.　　　　　　　　　　　(45) Date of Patent:　　　Aug. 4, 2026

(54) BLOCKER DOOR EQUIPPED WITH LARGE CAVITY ACOUSTIC STRUCTURE

(71) Applicant: THE BOEING COMPANY, Arlington, VA (US)

(72) Inventors: Michael J. Bailey, Summerville, SC (US); Jackie W. Wong, Seattle, WA (US); Alexandre D. Curaudeau, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 263 days.

(21) Appl. No.: 18/596,595

(22) Filed: Mar. 5, 2024

(65) Prior Publication Data

US 2025/0283438 A1　　Sep. 11, 2025

(51) Int. Cl.
*F02K 1/70*　　　　(2006.01)
*F02K 1/82*　　　　(2006.01)

(52) U.S. Cl.
CPC ................ *F02K 1/70* (2013.01); *F02K 1/827* (2013.01); *F05D 2260/96* (2013.01)

(58) Field of Classification Search
CPC ......... F05D 2260/96; F02K 1/70; F02K 1/827
See application file for complete search history.

(56) References Cited

U.S. PATENT DOCUMENTS

| | | | |
|---|---|---|---|
| 4,235,303 A | | 11/1980 | Dhoore et al. |
| 5,927,647 A | * | 7/1999 | Masters ................... F02K 1/72 |
| | | | 244/110 B |

| | | | |
|---|---|---|---|
| 9,604,438 B2 | | 3/2017 | Lumbab et al. |
| 9,741,331 B1 | * | 8/2017 | Alam ........................ B32B 5/30 |
| 10,294,867 B2 | | 5/2019 | Lumbab et al. |
| 11,568,845 B1 | * | 1/2023 | Manimala ............ G10K 11/172 |
| 11,879,395 B2 | * | 1/2024 | Wong ........................ F02C 7/20 |
| 12,209,556 B2 | * | 1/2025 | Billault ..................... F02K 1/72 |
| 2002/0064453 A1 | | 5/2002 | Tse |
| 2017/0321631 A1 | * | 11/2017 | Calder .................... F02K 1/763 |
| 2017/0328281 A1 | | 11/2017 | Pretty et al. |
| 2018/0230941 A1 | | 8/2018 | Gutierrez et al. |
| 2020/0339243 A1 | | 10/2020 | Bouillon et al. |
| 2021/0102513 A1 | * | 4/2021 | Le Boulicaut .......... F02K 1/827 |

FOREIGN PATENT DOCUMENTS

WO　　WO2023247893 A1　　12/2023

OTHER PUBLICATIONS

European Patent Office, Extended European Search Report issued in related application No. EP25155744, Jun. 30, 2025.

* cited by examiner

*Primary Examiner* — Forrest M Phillips

(74) *Attorney, Agent, or Firm* — Kolitch Romano Dascenzo Gates LLP

(57)　　　　　　ABSTRACT

The present disclosure provides a blocker door for a thrust reversing system of an aircraft engine assembly. The blocker door has a door body having a backplate. The blocker door also includes a perforated facesheet coupled with the door body. A plurality of ribs arranged between the backplate and the facesheet define a plurality of cavities that communicate with the plurality of perforations to create a plurality of acoustic cells.

20 Claims, 6 Drawing Sheets

BLOCKER DOOR EQUIPPED WITH LARGE CAVITY ACOUSTIC STRUCTURE

FIELD

Aspects of the present disclosure generally relate to aircraft noise attenuation, and, more particularly, to noise attenuating structures in an aircraft engine nacelle.

BACKGROUND

Ultra-high bypass ratio engines can provide significant fuel efficiency improvement but typically require larger nacelles to accommodate their increased fan diameters, which induces weight and drag penalties on aircraft. Compact architectures for these larger nacelles are being developed to help offset these inefficiencies. However, as nacelle architectures become more compact, the treatable acoustic area throughout the propulsion flow path is reduced. Moreover, some newer fans generate elevated tonal noise at certain frequencies. Smaller treatable acoustic areas and elevated tonal noise have presented certain challenges for aircraft engine assemblies to meet new, more stringent noise standards.

SUMMARY

The present disclosure provides a blocker door in one aspect. The blocker door includes a door body having a backplate. The blocker door also has a facesheet coupled with the door body and defining a plurality of perforations. Further, the blocker door has a plurality of ribs arranged between the backplate and the facesheet to define a plurality of cavities that communicate with the plurality of perforations to create a plurality of acoustic cells.

In one aspect, in combination with any example blocker door above or below, each cavity of the plurality of cavities has a length that is at least greater than ⅜ of an inch.

In one aspect, in combination with any example blocker door above or below, the blocker door defines a midline that separates the blocker door into a first side and a second side, and wherein the plurality of ribs includes a central-aft rib extending along the midline, a first-side aft rib angled with respect to the midline, a second-side aft rib angled with respect to the midline, a first-side central rib extending perpendicular to the midline, a second-side central rib extending perpendicular to the midline, a first-side central diagonal rib angled diagonal to the midline, and a second-side central diagonal rib angled diagonal to the midline, and wherein the central-aft rib, the first-side aft rib, the second-side aft rib, the first-side central rib, the second-side central rib, the first-side central diagonal rib, and the second-side central diagonal rib intersect at a central rib juncture.

In one aspect, in combination with any example blocker door above or below, the door body has an outer wall that extends from the backplate and along at least a portion of a perimeter of the door body, and wherein the central-aft rib, the first-side aft rib, the second-side aft rib, the first-side central rib, the second-side central rib, the first-side central diagonal rib, and the second-side central diagonal rib each respectively connect to the outer wall.

In one aspect, in combination with any example blocker door above or below, the door body has a hinge extending from the backplate in a direction opposite the plurality of ribs, and wherein the backplate defines a hinge recess in which the hinge is positioned, and wherein the door body includes a flange extending from the backplate, a mounting base, an outer wall, and wherein the plurality of ribs includes a partition rib and a hinge rib that extends between and connects the flange and the mounting base, and wherein the flange, the partition rib, the hinge rib, and the outer wall define a hinge cavity, which is one of the plurality of cavities, and wherein the hinge cavity mirrors the hinge recess along a thickness direction of the blocker door.

In one aspect, in combination with any example blocker door above or below, the hinge cavity has a portion that gradually increases in depth as the hinge cavity extends toward an end of the blocker door.

In one aspect, in combination with any example blocker door above or below, the door body includes a flange extending from the backplate and a mounting base that has one or more mounting structures, and wherein the plurality of ribs includes a first-side hinge rib and a second-side hinge rib that each extend between and connect the flange and the mounting base, and wherein the plurality of cavities includes a central forward cavity defined by the flange, the mounting base, the first-side hinge rib, and the second-side hinge rib.

In one aspect, in combination with any example blocker door above or below, the door body has an outer wall that extends from the backplate and along at least a portion of a perimeter of the door body, and wherein the door body includes a mounting base that includes one or more mounting structures, and wherein the plurality of ribs includes a central diagonal rib and a forward diagonal rib that each extend at an angle with respect to a midline of the blocker door and each extend perpendicular to one another, the central diagonal rib and the forward diagonal rib intersect at a rib juncture and each extend between and connect to the outer wall and the mounting base.

In one aspect, in combination with any example blocker door above or below, the blocker door has a forward end and an aft end and defines a midline that separates the blocker door into a first side and a second side, wherein the door body has an outer wall that extends from the backplate and along at least a portion of a perimeter of the door body, and wherein the door body includes a mounting base that includes one or more mounting structures, and wherein the plurality of ribs includes a first-side forward diagonal rib and a second-side forward diagonal rib, the first-side forward diagonal rib is arranged on the first side and extends between and connects to the outer wall and the mounting base, the second-side forward diagonal rib is arranged on the second side and extends between and connects to the outer wall and the mounting base, the first-side forward diagonal rib and the second-side forward diagonal rib converge toward one another as they extend toward the forward end.

In one aspect, in combination with any example blocker door above or below, the door body includes a mounting base that includes one or more mounting structures, and wherein the plurality of cavities includes a forward inner cavity defined by the mounting base, and a central diagonal rib and a forward diagonal rib of the plurality of ribs, and wherein the mounting base has a stepped sidewall that steps the mounting base inward toward a midline defined by the blocker door.

In one aspect, in combination with any example blocker door above or below, the blocker door defines a midline separating the blocker door into a first side and a second side, and wherein the plurality of ribs are arranged so that: at least two ribs of the plurality of ribs intersect at a first-side rib juncture on the first side of the blocker door, at least two ribs of the plurality of ribs intersect at a second-side rib juncture on the second side of the blocker door, and at least two ribs of the plurality of ribs intersect at a central rib juncture arranged coplanar with the midline.

In one aspect, in combination with any example blocker door above or below, an average volume of the acoustic cells ranges between 7 and 9 cubic inches.

In one aspect, in combination with any example blocker door above or below, the plurality of acoustic cells include ten to sixteen acoustic cells.

In one aspect, in combination with any example blocker door above or below, at least one of the plurality of acoustic cells is empty to allow for a volume of air to fill therein.

In one aspect, in combination with any example blocker door above or below, at least one of the plurality of acoustic cells has a volume of acoustic attenuating material disposed therein.

In one aspect, in combination with any example blocker door above or below, the ribs are integrally formed with the backplate as a monolithic unitary component.

The present disclosure further provides an aft fan duct assembly. The aft fan duct assembly includes an inner duct wall and an outer duct wall. The inner duct wall and the outer duct wall define a fan duct. The aft fan duct assembly also includes blocker doors arranged within the fan duct and each movable between a stowed position and a deployed position. Each one of the blocker doors includes a door body having a backplate and a plurality of ribs that extend from the backplate to define a plurality of cavities; and a facesheet coupled with the door body, wherein the facesheet encloses the plurality of cavities and defines a plurality of perforations that communicate with the plurality of cavities to create a plurality of acoustic cells.

In one aspect, in combination with any example aft fan duct assembly above or below, the plurality of ribs includes a set of ribs that intersect at a central rib juncture, wherein a first rib of the set extends along a midline defined by the blocker door, a second rib of the set extends perpendicular to the midline, and a third rib of the set extends diagonally between the first and second rib.

In one aspect, in combination with any example aft fan duct assembly above or below, the blocker door defines a midline separating the blocker door into a first side and a second side, and wherein the plurality of ribs are arranged so that: at least two ribs of the plurality of ribs intersect at a first-side rib juncture on the first side of the blocker door, at least at least two ribs of the plurality of ribs intersect at a second-side rib juncture on the second side of the blocker door, and at least two ribs of the plurality of ribs intersect at a central rib juncture arranged coplanar with the midline.

The present disclosure further provides a method of fabricating a blocker door. The method includes creating a door body from a block of material, the door body having a backplate and a plurality of ribs that extend from the backplate to define a plurality of cavities. The method further includes coupling a facesheet to the door body to enclose the plurality of cavities and so that a plurality of perforations defined by the facesheet communicate with the plurality of cavities to create a plurality of acoustic cells.

The present disclosure provides a blocker door in yet another aspect. The blocker door includes a door body having a backplate and a plurality of ribs that extend from the backplate to define a plurality of cavities. The blocker door also includes a facesheet coupled with the door body. The facesheet encloses the plurality of cavities and defines a plurality of perforations that communicate with the plurality of cavities to create a plurality of acoustic cells.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
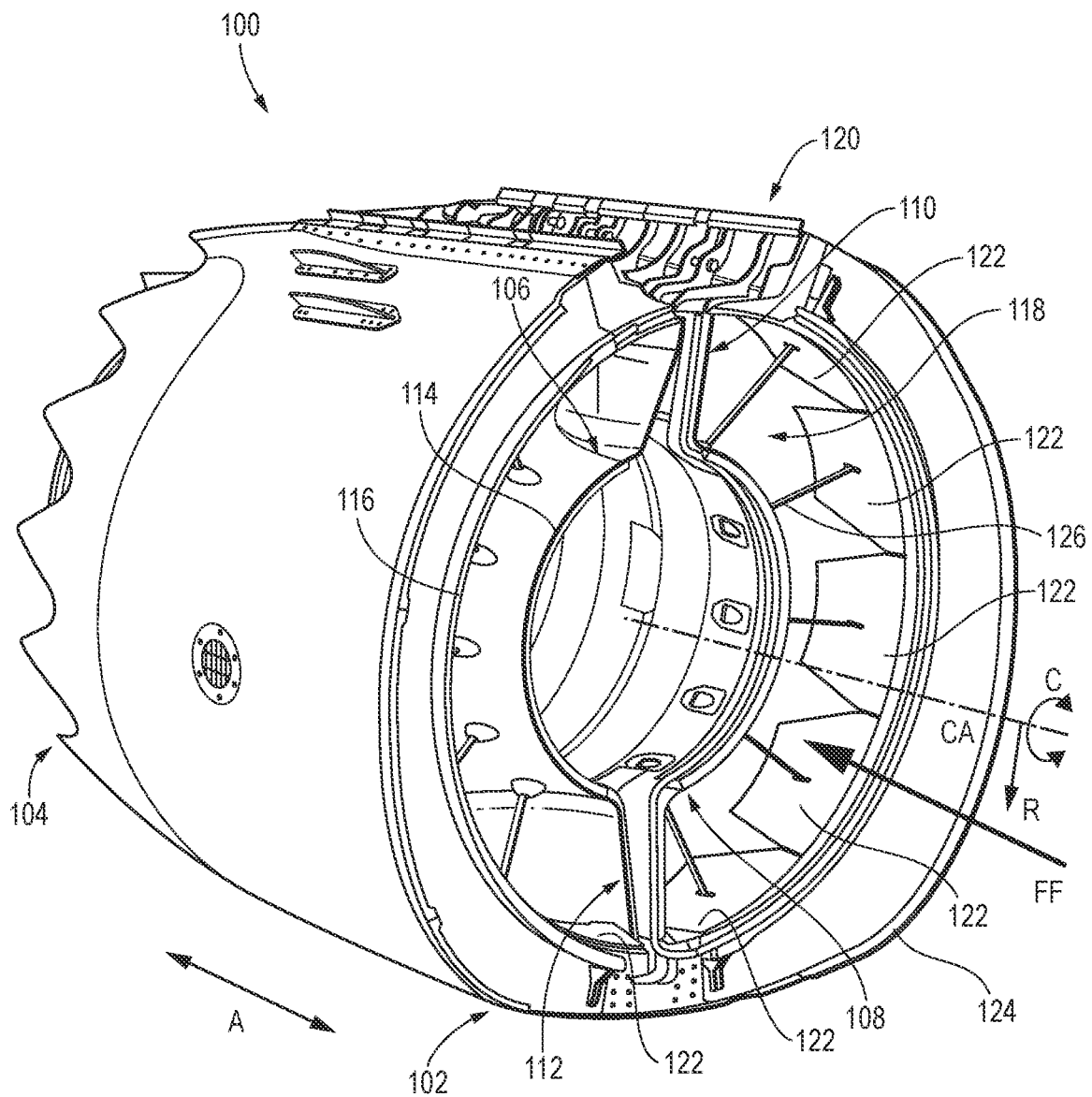
FIG. 1 is a perspective view of an aft fan duct assembly for an aircraft engine assembly according to an example aspect of the present disclosure.

Blocker doors can be incorporated into a thrust reversing system of an aircraft engine assembly and can be deployed to block or redirect fan bypass airflow after touchdown of an aircraft to ultimately produce reverse thrust, which aids in reducing the speed of the aircraft. When stowed during normal flight operations, blocker doors can form a boundary of a bypass flow duct. Disclosed herein is a blocker door equipped with features that can advantageously attenuate noise, such as aft-radiating noise from an aircraft engine. The acoustic features of the blocker door can reduce noise and mitigate elevated tonal noise of modern aircraft engines at certain frequencies, particularly during takeoffs and landings. Such features allow for aircraft engines to address new, more stringent noise standards and increased landing fees at airports. Moreover, the acoustic features can be integrated with or formed at least in part by structural features, providing for a weight-efficient, structurally-sound, and acoustically-enhanced blocker door.

In some example aspects, a blocker door can include a door body having a backplate and a plurality of structurally-active ribs that extend from the backplate to define a plurality of cavities. The ribs are structurally-active in that they carry loads imparted to the blocker door. The ribs can be redesigned existing structural elements and can include additional "close-out" ribs or stiffeners to improve the impedance characteristics of the cavities. A relatively thin facesheet can be overlaid onto the door body and coupled thereto, e.g., with mechanical fasteners. The facesheet encloses the plurality of cavities but also defines a plurality of perforations that communicate with the plurality of cavities, which creates a plurality of acoustic cells or resonance chambers that can be used to attenuate community noise during takeoff, approach, landing, and cruise. The perforations in the facesheet enable fluid flow into the acoustic cells, allowing noise to be attenuated. In some alternative aspects, the structurally-active ribs can be integrally formed with the facesheet and coupled to the backplate when the facesheet is overlaid onto the door body. Each blocker door of a thrust reversing system can include such acoustic features. In this way, aft-radiating noise from an aircraft engine can be attenuated, which can provide improved acoustics in compact nacelle architectures, among other possible advantages, benefits, and/or technical effects.

As a further advantage, benefit, and/or technical effect, the blocker door of the present disclosure can enable the use of alternate materials and fabrication processes for acoustic attenuation capabilities, which can reduce costs over traditional methods. As yet a further advantage, benefit, and/or technical effect, the blocker door of the present disclosure can utilize sections of a door body that have not traditionally been utilized for acoustic attenuation purposes, such as proximate the hinge fittings. This can increase the acoustic attenuation capabilities of the blocker door. The blocker door of the present disclosure can have further advantages, benefits, and/or technical effects than those noted herein.

FIG. 1 is a perspective view of a portion of an aft fan duct assembly 100 according to an example aspect of the present disclosure. The aft fan duct assembly 100 can be incorporated into an aircraft engine assembly, for example. The aft fan duct assembly 100 can be located in an aft portion of the aircraft engine assembly, or more generally, an aft part of an aircraft nacelle. For reference, the aft fan duct assembly 100 defines an axial direction A, a radial direction R, and a circumferential direction C. The aft fan duct assembly 100 also defines a central axis CA, which extends along the axial direction A.

The aft fan duct assembly 100 has a forward end 102 and an aft end 104. The aft end 104 is spaced from the forward end 102, e.g., along the axial direction A. The aft fan duct assembly 100 has a bifurcated construction and includes a pair of barrel-shaped structures, or duct assemblies 106, 108. The duct assemblies 106, 108 each include upper and lower fairings (or radial walls) that are coupled respectively with an upper beam (e.g., a hinge beam) and a lower beam (e.g., a latch beam). In this regard, the aft fan duct assembly 100 includes upper and lower bifurcation assemblies 110, 112. The duct assemblies 106, 108 form an inner duct wall 114. The inner duct wall 114 is spaced inward of an outer duct wall 116 along the radial direction R with respect to the central axis CA. A fan duct 118 (e.g., an ultra-high bypass fan duct), or rather a downstream or aft portion thereof, is defined between the inner duct wall 114 and the outer duct wall 116. It will be appreciated that the aft fan duct assembly 100 can be coupled with, and positioned aft of, a forward fan duct assembly. The forward fan duct assembly can include a fan and can define an upstream portion of the fan duct 118. A core turbine engine can extend through the forward fan duct assembly and the aft fan duct assembly.

The aft fan duct assembly 100 can include a thrust reversing system 120 or thrust reverser. The thrust reversing system 120 includes, among other things, a plurality of blocker doors 122 arranged within the fan duct 118. The blocker doors 122 are circumferentially arranged about both bifurcated sections of the fan duct 118. Each one of the blocker doors 122 can be movable between a stowed position and a deployed position. The blocker doors 122 can be individually or collectively actuated, e.g., by one or more actuators of the thrust reversing system 120. The actuators can be arranged within the annulus between the outer duct wall 116 and an outer cowl 124 of the aft fan duct assembly 100. Each one of the blocker doors 122 is coupled with the outer duct wall 116 via one or more hinge fittings and with the inner duct wall 114 via respective drag links 126.

During normal flight operations, the blocker doors 122 can be moved to their respective stowed positions in which the blocker doors 122 are substantially retracted or removed from the fan duct 118 to allow for a fluid flow FF, e.g., a fan bypass air stream, to flow through the fan duct 118 and exit the aft end 104. The blocker doors 122 are shown in their respective stowed positions in FIG. 1. In other flight operations, such as immediately after a normal touchdown of an aircraft, the blocker doors 122 can be moved to their respective deployed positions to block the fluid flow FF from exiting the aft end 104, as otherwise occurs during normal flight. In this way, the blocker doors 122 physically redirect the fluid flow FF to ultimately produce a reverse-thrust effect. The redirected fluid flow can be directed by the blocker doors 122 into cascade sets or redirecting structures to further redirect the fluid flow FF to produce a reverse-thrust effect. To move a blocker door from the stowed position to the deployed position, the trailing or aft end of the blocker door, as considered from its orientation in the stowed position, is moved radially inward (toward the central axis CA) and axially forward (toward the forward end 102). In the deployed position, the blocker doors 122 can be arranged to be substantially perpendicular (e.g., at least within 10° of perpendicular) to the axial direction A to substantially block the fluid flow FF from exiting the aft end 104. To move the blocker door from the deployed position to the stowed position, the trailing or aft end of the blocker door is moved radially outward (away from the central axis CA) and axially aft (toward the aft end 104). An example acoustically-treated blocker door is provided below.

Figure 2:
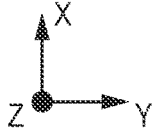
FIG. 2 is a view of a flowpath facing side of a blocker door according to an example aspect of the present disclosure.
Figure 3:
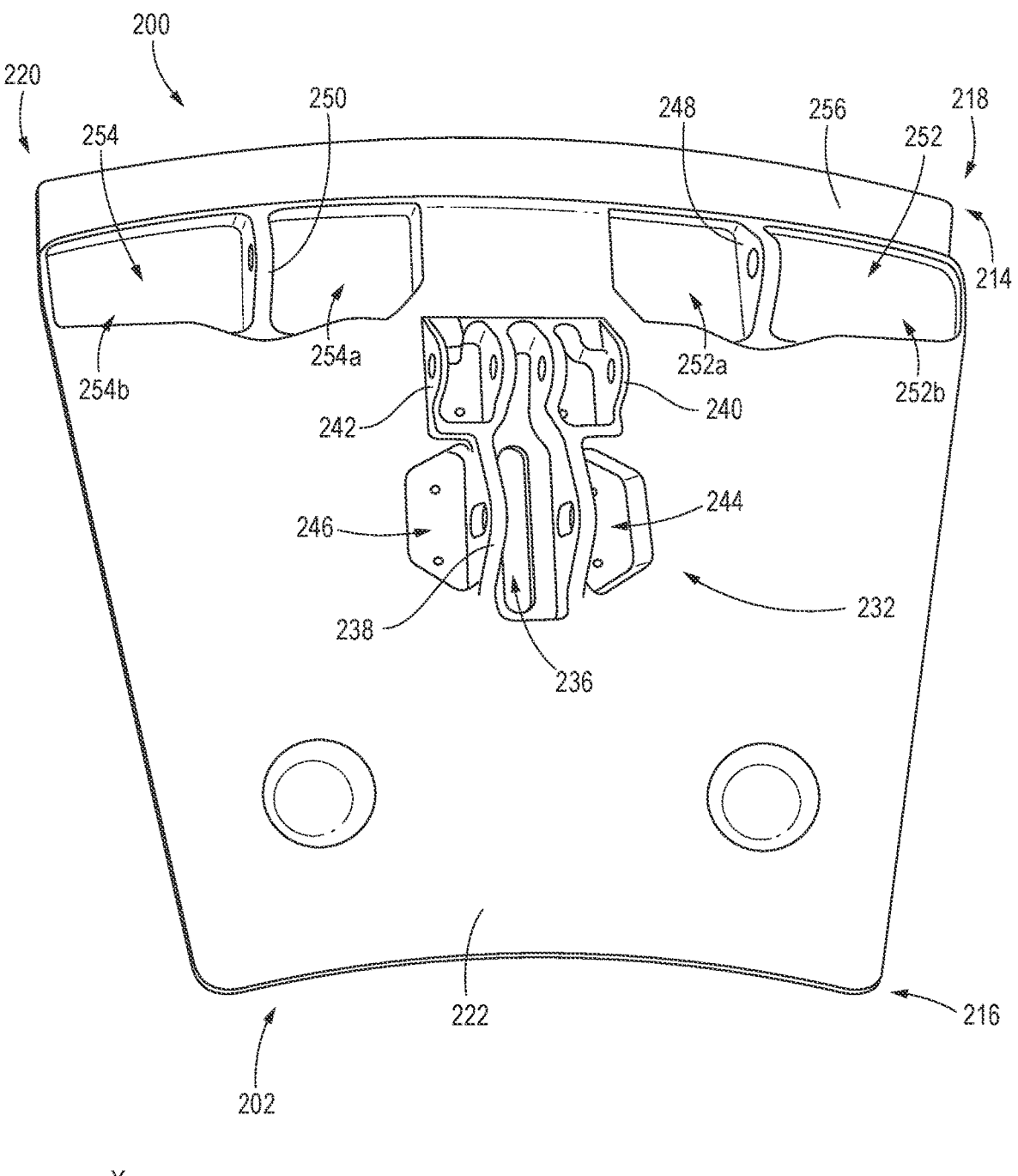
FIG. 3 is a view of a non-flowpath facing side the blocker door of FIG. 2.

FIGS. 2 and 3 depict various views of a blocker door 200 according to an example aspect of the present disclosure. The blocker door 200 can be incorporated into the thrust reversing system 120 of the aft fan duct assembly 100 of FIG. 1, for example. FIG. 2 is a view of a side of the blocker door 200 that faces a flow path (e.g., a bypass flow path) and FIG. 3 is a view of the blocker door 200 flipped over with respect to its orientation in FIG. 2.

As shown, the blocker door 200 has a door body 202 and a facesheet 204 (FIGS. 4 and 5) coupled with the door body 202. The facesheet 204 can be mechanically fastened to the door body 202 via one or more fasteners 206 (FIG. 5), for example. The facesheet 204 has been removed for illustrative purposes in FIG. 2 and is not visible in FIG. 3. In at least some examples, the door body 202 can be formed from an aluminum block (e.g., the door body 202 can be machined or "hogged out") and the facesheet 204 can be formed as a composite structure. In other example aspects, the door body 202 can be formed by other processes, such as by thermoplastic compression molding, thermoplastic injection molding, additive manufacturing, etc.

For reference, the blocker door 200 defines a first direction X, a second direction Y, and a third direction Z. The first, second, and third directions X, Y, Z are mutually perpendicular to one another and form an orthogonal direction system. The blocker door 200 also defines a midline 208 that splits the blocker door 200 into a first side 210 and a second side 212. The midline 208 extends along the first direction X. The blocker door 200 has a forward end 214, or hinge end, and an aft end 216, or free end. The "forward" and "aft" ends of the blocker door 200 are designated with respect to the blocker door 200 being disposed in a stowed position. Further, the blocker door 200 has a first end 218 and a second end 220. The door body 202 has a length extending along the first direction X, a width extending along the second direction Y, and a height extending along the third direction Z. The width of the door body 202 can be variable. In this example, the width of the door body 202 generally tapers toward the aft end 216 as shown in FIG. 2.

The door body 202 has a backplate 222 that forms a base structure of the door body 202. As shown in FIG. 2, various structures extend from the backplate 222, including various walls. In this example, an outer wall 224 extends from the backplate 222 along a portion of a perimeter of the door body 202. The outer wall 224 generally has a U-shaped when viewed along the third direction Z, as in FIG. 2. The outer wall 224 has a height extending along the third direction Z. The outer wall 224 has a plurality of integrated outer wall bosses 226 or threaded inserts, which are spaced from one another along the perimeter of the door body 202. In some alternative aspects, the outer wall bosses 226 or threaded inserts of the outer wall 224 can be omitted and the facesheet 204 (FIGS. 4 and 5) can be coupled with the door body 202 using an alternative attachment scheme, such as thermoplastic welding, adhesive bonding, etc.

A first-side partition rib 228 connects to the outer wall 224, e.g., at the first end 218, and extends generally along the second direction Y. A second-side partition rib 230 connects to the outer wall 224, e.g., at the second end 220, and extends generally along the second direction Y. The first-side partition rib 228 and the second-side partition rib 230 both connect to a mounting base 232. The mounting base 232 has a wall 234 that defines a slot 236, which is configured to receive a drag link (see e.g., drag links 126 extending through respective slots of the blocker doors 122 in FIG. 1). In at least some aspects, the wall 234 has a same or similar height as the outer wall 224 and the first-side and second-side partition ribs 228, 230. As shown in FIG. 3, the mounting base 232 has various mounting structures, including a first clevis 238 and a pair of second clevises 240, 242. The backplate 222, the wall 234 of the mounting base 232, and arms of the first clevis 238 define a pair of recesses 244, 246 on opposing sides of the first clevis 238. The recesses 244, 246 and openings in the arms of the first clevis 238 allow for a pin or like structure to couple a drag link with the blocker door 200. The second clevises 240, 242 may also receive respective pins to couple the drag link with the blocker door 200. These mounting structures can be formed integrally with the other portions of the door body 202 or can be bolted to the backplate 222, for example.

The door body 202 can include other mounting structures in addition to the mounting structures noted above, including a first hinge 248 and a second hinge 250. In at least some aspects, the first and second hinges 248, 250 can be integrally formed with the backplate 222. In other aspects, the first and second hinges 248, 250 can be bolted or otherwise secured to the backplate 222. Apertures of the first and second hinges 248, 250 can receive respective pins or like structures that can pivotally couple the blocker door 200, e.g., with an outer wall of an aft fan duct assembly. The backplate 222 defines a first hinge recess 252 associated with the first hinge 248 and a second hinge recess 254 associated with the second hinge 250. The first hinge 248 separates the first hinge recess 252 into separate inner and outer sections 252A, 252B and the second hinge 250 separates the second hinge recess 254 into separate inner and outer sections 254A, 254B. The first and second hinge recesses 252, 254 can reduce the height of the first and second hinges 248, 250 with respect to the backplate 222 and can facilitate receipt of pins or like structures in the apertures of the first and second hinges 248, 250. In at least some examples, the outer section 252B of the first hinge recess 252 can become gradually shallower as it (the first hinge recess 252) extends from the first hinge 248 toward the first end 218. Similarly, the outer section 254B of the second hinge recess 254 becomes gradually shallower as it (the second hinge recess 254) extends from the second hinge 250 toward the second end 220. A flange 256 extends from the backplate 222, e.g., at the forward end 214. The flange 256 can extend a full width of the door body 202.

Figures 4, 5:
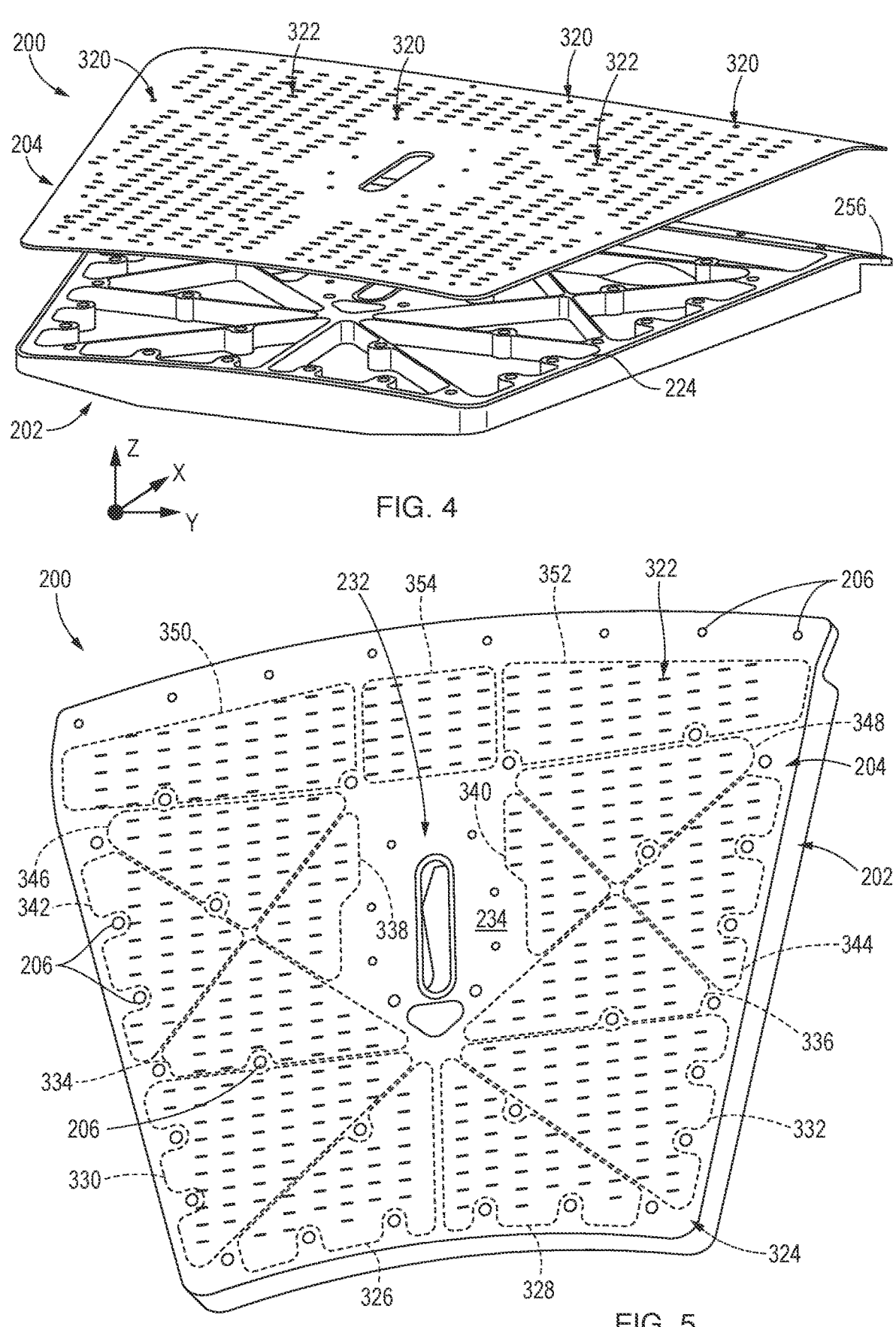
FIG. 4 is an exploded view of the blocker door of FIG. 2.
FIG. 5 is an assembled view of the blocker door of FIG. 2 and depicts acoustic cells thereof.

As further shown in FIG. 2, various structurally-active ribs or stiffeners protrude or extend from the backplate 222 to define a plurality of cavities. As illustrated in FIG. 2, the door body 202 includes a plurality of ribs, including the first-side partition rib 228, the second-side partition rib 230, a central-aft rib 258, a first-side aft rib 260, a second-side aft rib 262, a first-side central rib 264, a second-side central rib 266, a first-side central diagonal rib 268, a second-side central diagonal rib 270, a first-side forward diagonal rib 272, a second-side forward diagonal rib 274, a first-side hinge rib 276, and a second-side hinge rib 278. One or more of the ribs can include bosses or threaded inserts, which are arranged to receive fasteners to couple the facesheet 204 (FIGS. 4 and 5) with the door body 202. In at least some example aspects, the ribs can be arranged to efficiently carry loads rather than optimized to create cavities for acoustic purposes. In some aspects, the ribs, outer wall 224, and wall 234 are at a same or complementary height with respect to one another so that the facesheet 204 (FIGS. 4 and 5) can be overlaid onto the door body 202 flat or relatively flat. In some example aspects, the structurally-active ribs can be integrally formed with the backplate as a monolithic unitary component. In other example aspects, the structurally-active ribs can be formed and secondarily bonded or joined to the backplate 222 and/or to the facesheet 204 (FIGS. 4 and 5). In yet other example aspects, the structurally-active ribs can be integrally formed with the facesheet 204 and then secondarily arranged relative to the door body 202 so as to define acoustic cells.

The central-aft rib 258 extends between an aft portion of the outer wall 224 and a central rib juncture 280. The central-aft rib 258 extends parallel with the midline 208. In the example of FIG. 2, the central-aft rib 258 is coplanar with the midline 208. The first-side aft rib 260 extends between a first-side aft portion of the outer wall 224 and the central rib juncture 280. The first-side aft rib 260 is angled (e.g., by 45°) with respect to the midline 208. In this way, the first-side aft rib 260 is arranged diagonally with respect to the first direction X. The second-side aft rib 262 generally mirrors the first-side aft rib 260 and extends between a second-side aft portion of the outer wall 224 and the central rib juncture 280. The second-side aft rib 262 is angled with respect to the midline 208, e.g., by a same angle as first-side aft rib 260 is angled with respect to the midline 208 but with an opposite sign. Thus, the second-side aft rib 262 is arranged diagonally with respect to the first direction X. The first-side aft rib 260 connects to the outer wall 224 at the first end 218 while the second-side aft rib 262 connects to the outer wall 224 at the second end 220.

The first-side central rib 264 extends between a first-side central portion of the outer wall 224 and the central rib juncture 280. The first-side central rib 264 extends generally along the second direction Y. The second-side central rib 266 mirrors the first-side central rib 264 and extends between a second-side central portion of the outer wall 224 and the central rib juncture 280. The second-side central rib 266 extends generally along the second direction Y. The first-side central rib 264 connects to the outer wall 224 at the first end 218 while the second-side central rib 266 connects to the outer wall 224 at the second end 220.

The first-side central diagonal rib 268 extends between the central rib juncture 280 and a juncture of a first-side forward portion of the outer wall 224 and the first-side partition rib 228. The first-side central diagonal rib 268 supports the first-side aft portion of the mounting base 232. The first-side central diagonal rib 268 is angled (e.g., by 45°) with respect to the midline 208. In this way, the first-side central diagonal rib 268 is arranged diagonally with respect to the first direction X. The first-side central diagonal rib 268 extends substantially perpendicular (e.g., at least within 10° of perpendicular) to the first-side aft rib 260. The second-side central diagonal rib 270 mirrors the first-side central diagonal rib 268 and extends between the central rib juncture 280 and a juncture of a second-side forward portion of the outer wall 224 and the second-side partition rib 230. The second-side central diagonal rib 270 is angled with respect to the midline 208, e.g., by a same angle as the first-side central diagonal rib 268 is angled with respect to the midline 208 but with an opposite sign. Thus, the second-side central diagonal rib 270 is arranged diagonally with respect to the first direction X. The second-side central diagonal rib 270 extends substantially perpendicular (e.g., at least within 10° of perpendicular) to the second-side aft rib 262. The second-side central diagonal rib 270 supports the second-side aft portion of the mounting base 232.

In the example of FIG. 2, the central rib juncture 280 provides an intersection of seven (7) ribs. In this regard, the central rib juncture 280 provides a centralized stiffening structure to the blocker door 200 and allows loads to be distributed to the various ribs intersecting with the central rib juncture 280. The central rib juncture 280 also provides stiffness and structural support to the mounting base 232. The central rib juncture 280 can be coplanar, at least in part, with the midline 208.

The first-side forward diagonal rib 272 extends between a first-side central portion of the outer wall 224 and a juncture of the first-side partition rib 228 and a forward portion of the mounting base 232. Accordingly, the first-side forward diagonal rib 272 supports the first-side forward portion of the mounting base 232. The first-side forward diagonal rib 272 connects to the outer wall 224 at the first end 218. The first-side forward diagonal rib 272 is angled (e.g., by 40°) with respect to the midline 208. In this way, the first-side forward diagonal rib 272 is arranged diagonally with respect to the first direction X. In at least one example, such as in FIG. 2, the first-side forward diagonal rib 272 extends substantially perpendicular (e.g., at least within 10° of perpendicular) to the first-side central diagonal rib 268. The first-side central diagonal rib 268 and the first-side forward diagonal rib 272 intersect at a first-side rib juncture 282. The first-side rib juncture 282, or intersection of the first-side central diagonal rib 268 and the first-side forward diagonal rib 272, provides stiffness and structural support to the blocker door 200 at the first side 210.

The second-side forward diagonal rib 274 mirrors the first-side forward diagonal rib 272 and extends between a second-side central portion of the outer wall 224 and a juncture of the second-side partition rib 230 and a forward portion of the mounting base 232. Thus, the second-side forward diagonal rib 274 supports the second-side forward portion of the mounting base 232. The second-side forward diagonal rib 274 connects to the outer wall 224 at the second end 220. The second-side forward diagonal rib 274 is angled with respect to the midline 208, e.g., by a same angle as the first-side forward diagonal rib 272 is angled with respect to the midline 208 but with an opposite sign. In this way, second-side forward diagonal rib 274 is arranged diagonally with respect to the first direction X. In at least one example, such as in FIG. 2, the second-side forward diagonal rib 274 extends substantially perpendicular (e.g., at least within 10° of perpendicular) to the second-side central diagonal rib 270. The second-side central diagonal rib 270 and the second-side forward diagonal rib 274 intersect at a second-side rib juncture 284. The second-side rib juncture 284, or intersection of the second-side central diagonal rib 270 and the second-side forward diagonal rib 274, provides stiffness and structural support to the blocker door 200 at the second side 212. The first-side forward diagonal rib 272 and the second-side forward diagonal rib 274 converge toward one another as they extend toward the forward end 214. Stated differently, the first-side forward diagonal rib 272 and the second-side forward diagonal rib 274 diverge away from one another as they extend toward the aft end 216.

The first-side hinge rib 276 extends between the flange 256 and a juncture of the first-side partition rib 228, the first-side forward diagonal rib 272, and the mounting base 232. The first-side hinge rib 276 extends generally along the first direction X. The second-side hinge rib 278 extends between the flange 256 and a juncture of the second-side partition rib 230, the second-side forward diagonal rib 274, and the mounting base 232. The second-side hinge rib 278 extends generally along the first direction X. The first-side hinge rib 276 and the second-side hinge rib 278 are spaced from one another, e.g., along the second direction Y, and in at least some examples, are parallel to one another.

The ribs and other structures of the door body 202 can define a plurality of cavities (e.g., non-uniform cavities). For the example of FIG. 2, the ribs and other structures of the door body 202 define a number of distinct cavities, including a first-side aft inner cavity 286 (a first cavity), a second-side aft inner cavity 288 (a second cavity), a first-side aft outer cavity 290 (a third cavity), a second-side aft outer cavity 292 (a fourth cavity), a first-side central cavity 294 (a fifth cavity), a second-side central cavity 296 (a sixth cavity), a first-side forward inner cavity 298 (a seventh cavity), a second-side forward inner cavity 300 (an eighth cavity), a first-side forward outer cavity 302 (a ninth cavity), a second-side forward outer cavity 304 (a tenth cavity), a first-side forward cavity 306 (an eleventh cavity), a second-side forward cavity 308 (a twelfth cavity), a first-side hinge cavity 310 (a thirteenth cavity), a second-side hinge cavity 312 (a fourteenth cavity), and a central forward cavity 314 (a fifteenth cavity). In at least some example aspects, each cavity is defined by at least two structurally-active ribs. In at least some example aspects, each cavity of the plurality of cavities has a length (e.g., a length extending across a given cavity) that is at least greater than ⅜ of an inch. In this regard, the blocker door 200 can be deemed a blocker door with a "large cavity acoustic structure".

The first-side aft inner cavity 286 is defined by the central-aft rib 258, the first-side aft rib 260, and the outer wall 224. In at least some aspects, the first-side aft inner cavity 286 has a generally triangular shape. The second-side aft inner cavity 288 is defined by the central-aft rib 258, the second-side aft rib 262, and the outer wall 224. In at least some aspects, the second-side aft inner cavity 288 has a generally triangular shape and generally mirrors the first-side aft inner cavity 286. The first-side aft outer cavity 290 is defined by the first-side aft rib 260, the first-side central rib 264, and the outer wall 224. In at least some aspects, the first-side aft outer cavity 290 has a generally triangular shape. The second-side aft outer cavity 292 is defined by the second-side aft rib 262, the second-side central rib 266, and the outer wall 224. In at least some aspects, the second-side aft outer cavity 292 has a generally triangular shape and mirrors the first-side aft outer cavity 290.

The first-side central cavity 294 is defined by the first-side central rib 264, the first-side central diagonal rib 268, and the first-side forward diagonal rib 272. In at least some aspects, the first-side central cavity 294 has a generally triangular shape. The second-side central cavity 296 is defined by the second-side central rib 266, the second-side central diagonal rib 270, and the second-side forward diagonal rib 274. In at least some aspects, the second-side central cavity 296 has a generally triangular shape and generally mirrors the first-side central cavity 294.

The first-side forward inner cavity 298 is defined by the first-side central diagonal rib 268, the first-side forward diagonal rib 272, and the mounting base 232. In at least some aspects, the first-side forward inner cavity 298 has a generally triangular shape. However, the mounting base 232 has a stepped sidewall 316 that steps the mounting base 232 inward toward the midline 208, which increases the volume of the first-side forward inner cavity 298. The second-side forward inner cavity 300 is defined by the second-side central diagonal rib 270, the second-side forward diagonal rib 274, and the mounting base 232. In at least some aspects, the second-side forward inner cavity 300 has a generally triangular shape and mirrors the first-side forward inner cavity 298. However, the mounting base 232 has a stepped sidewall 318 that steps the mounting base 232 inward toward the midline 208, which increases the volume of the second-side forward inner cavity 300.

The first-side forward outer cavity 302 is defined by the first-side central diagonal rib 268, the first-side forward diagonal rib 272, and the outer wall 224. In at least some aspects, the first-side forward outer cavity 302 has a generally triangular shape. The second-side forward outer cavity 304 is defined by the second-side central diagonal rib 270, the second-side forward diagonal rib 274, and the outer wall 224. In at least some aspects, the second-side forward outer cavity 304 has a generally triangular shape and mirrors the first-side forward outer cavity 302.

The first-side forward cavity 306 is defined by the first-side central diagonal rib 268, the first-side forward diagonal rib 272, and the first-side partition rib 228. In at least some aspects, the first-side forward cavity 306 has a generally triangular shape. The second-side forward cavity 308 is defined by the second-side central diagonal rib 270, the second-side forward diagonal rib 274, and the second-side partition rib 230. In at least some aspects, the second-side forward cavity 308 has a generally triangular shape and mirrors the first-side forward cavity 306.

The first-side hinge cavity 310 is defined by the outer wall 224, the first-side partition rib 228, the flange 256, and the first-side hinge rib 276. The first-side hinge cavity 310 extends the length of the first hinge recess 252 along the first direction X. For this example, the first-side hinge cavity 310 gradually increases in depth from the first hinge 248 (FIG. 3) to the first end 218, and inversely, the outer section 252B of the first hinge recess 252 can become gradually shallower, as noted previously. Accordingly, the first-side hinge cavity 310 mirrors the first hinge recess 252 along a thickness direction of the blocker door 200, or rather, the third direction Z. The depth of the first-side hinge cavity 310 can remain constant from the first hinge 248 to the first-side hinge rib 276. In this regard, the first-side hinge cavity 310 has a constant depth portion (e.g., between the first hinge 248 and the first-side hinge rib 276) and a variable depth portion (e.g., between the first hinge 248 and the first end 218). The ramped or variable depth portion of the first-side hinge cavity 310 can advantageously increase the volume of the first-side hinge cavity 310, which can enhance the acoustic attenuation of the blocker door 200.

The second-side hinge cavity 312 mirrors the first-side hinge cavity 310 and is defined by the outer wall 224, the second-side partition rib 230, the flange 256, and the second-side hinge rib 278. The second-side hinge cavity 312 extends the length of the second hinge recess 254 along the first direction X. For this example, the second-side hinge cavity 312 gradually increases in depth from the second hinge 250 (FIG. 3) to the second end 220, and inversely, the outer section 254B of the second hinge recess 254 can become gradually shallower, as noted previously. Accordingly, the second-side hinge cavity 312 mirrors the second hinge recess 254 along a thickness direction of the blocker door 200, or rather, the third direction Z. The depth of the second-side hinge cavity 312 can remain constant from the second hinge 250 to the second-side hinge rib 278. In this way, the second-side hinge cavity 312 has a constant depth portion (e.g., between the second hinge 250 and the second-side hinge rib 278) and a variable depth portion (e.g., between the second hinge 250 and the second end 220). The ramped or variable depth portion of the second-side hinge cavity 312 can advantageously increase the volume of the second-side hinge cavity 312, which can enhance the acoustic attenuation of the blocker door 200.

The central forward cavity 314 is generally defined between the first-side hinge cavity 310 and the second-side hinge cavity 312, e.g., along the first direction X, and is defined between the flange 256 and the mounting base 232, e.g., along the second direction Y. Accordingly, the central forward cavity 314 is defined by the mounting base 232, the flange 256, the first-side hinge rib 276, and the second-side hinge rib 278.

While FIG. 2 depicts one example arrangement in which the structurally-active ribs can be arranged to define the cavities, the structurally-active ribs can have other arrangements in other example aspects. For instance, in other example aspects, more or less ribs can be included, the ribs can be arranged asymmetrically with respect to the midline 208, the ribs can have other symmetric arrangements than the one illustrated in FIG. 2, etc.

With reference now to FIGS. 4 and 5, FIG. 4 shows an exploded view of the blocker door 200 and FIG. 5 shows an assembled version of the blocker door 200. As shown, the facesheet 204 can be laid over the door body 202 and coupled thereto. The facesheet 204 is generally shaped to fit or overlay over an entirety of the door body 202, e.g., as viewed along the third direction Z. The facesheet 204 contacts or is seated on the flange 256, top surfaces of the structurally-active ribs, the top surface of the outer wall 224, and the wall 234 of the mounting base 232. The facesheet 204 can define a plurality of apertures 320 that can be aligned in communication with the bosses or threaded inserts of the door body 202 and, if applicable, openings defined in the flange 256 (see FIG. 4). The apertures 320 can be circular openings arranged to receive fasteners therethrough, for example. Accordingly, in at least some examples, the facesheet 204 can be mechanically fastened to the door body 202 via fasteners 206. In other examples, the facesheet 204 can be bonded using thermoplastic welding, adhesive bonding, etc.

The facesheet 204 can also define a plurality of perforations 322, such as the slotted perforations shown in FIGS. 4 and 5. The perforations 322 extend lengthwise along the second direction Y in this example. In other example aspects, the perforations can have other shapes, such as circular openings. The facesheet 204 can define the perforations 322 so that each one of the cavities defined by the door body 202 has at least one perforation in communication therewith. In this way, with the facesheet 204 coupled with the door body 202, the facesheet 204 encloses the plurality of cavities 286, 288, 290, 292, 294, 296, 298, 300, 302, 304, 306, 308, 310, 312, 314 (FIG. 2) and the perforations 322 communicate with the plurality of cavities 286, 288, 290, 292, 294, 296, 298, 300, 302, 304, 306, 308, 310, 312, 314 to create a plurality of acoustic cells, collectively acoustic cells 324. In this regard, the acoustic cells 324 are created by their respective cavities being enclosed by the facesheet 204 and flow communication being provided by the perforations 322 to allow fluid (e.g., high bypass air) to flow into and out of the acoustic cells 324. The acoustic cells 324 function to attenuate noise, and more specifically, aft-radiating noise from an aircraft engine assembly.

In FIG. 5, the acoustic cells 324 are depicted by the dashed-lined sections. In this example, the blocker door 200 includes fifteen (15) distinct acoustic cells 324. As shown in FIG. 5, the acoustic cells 324 include a first-side aft inner cell 326 (a first acoustic cell), a second-side aft inner acoustic cell 328 (a second acoustic cell), a first-side aft outer cell 330 (a third acoustic cell), a second-side aft outer cell 332 (a fourth acoustic cell), a first-side central cell 334 (a fifth acoustic cell), a second-side central cell 336 (a sixth acoustic cell), a first-side forward inner cell 338 (a seventh acoustic cell), a second-side forward inner cell 340 (an eighth acoustic cell), a first-side forward outer cell 342 (a ninth acoustic cell), a second-side forward outer cell 344 (a tenth acoustic cell), a first-side forward cell 346 (an eleventh acoustic cell), a second-side forward cell 348 (a twelfth acoustic cell), a first-side hinge cell 350 (a thirteenth acoustic cell), a second-side hinge cell 352 (a fourteenth acoustic cell), and a central forward cell 354 (a fifteenth acoustic cell). As illustrated, each one of the acoustic cells 324 corresponds to one of the cavities 286, 288, 290, 292, 294, 296, 298, 300, 302, 304, 306, 308, 310, 312, 314 (FIG. 2) and has a plurality of perforations 322 associated therewith, which allows for flow communication between the acoustic cells 324 and e.g., the flow passage in which the blocker door 200 is positioned.

In other examples, the blocker door 200 can include more or less than fifteen (15) acoustic cells. For instance, in some example aspects, the plurality of acoustic cells 324 can range between ten to sixteen acoustic cells (including the endpoints), which can advantageously balance the structural, acoustic, and weight considerations of the blocker door 200. In some example aspects, an average volume of the acoustic cells 324 can range between 7 and 9 cubic inches, which can advantageously balance the structural, acoustic, and weight considerations of the blocker door 200. In yet other example aspects, the acoustic cells 324 can cover an area of the blocker door 200 that is greater than eighty percent (80%) of a total area of the blocker door 200, e.g., as viewed along the third direction Z. In some additional example aspects, the mounting base 232 can be surrounded by acoustic cells 324, e.g., as shown in FIG. 5, which can make efficient use of the space of the blocker door 200.

In some example aspects, at least one of the plurality of acoustic cells 324 is empty to allow for a volume of air to fill therein. That is, the cavities 286, 288, 290, 292, 294, 296, 298, 300, 302, 304, 306, 308, 310, 312, 314 can be empty cavities. In other example aspects, at least one of the plurality of acoustic cells 324 can have a volume of acoustic attenuating material disposed therein, such as a honeycomb structure.

In some alternative aspects, as noted previously, at least some of the structurally-active ribs can be formed and secondarily bonded or joined to the backplate 222 and/or to the facesheet 204. In yet other example aspects, at least some of the structurally-active ribs can be integrally formed with the facesheet 204, and the facesheet 204 having the structurally-active ribs can be arranged and secured relative to a door body so as to define the acoustic cells. An example is provided below.

Figure 6:
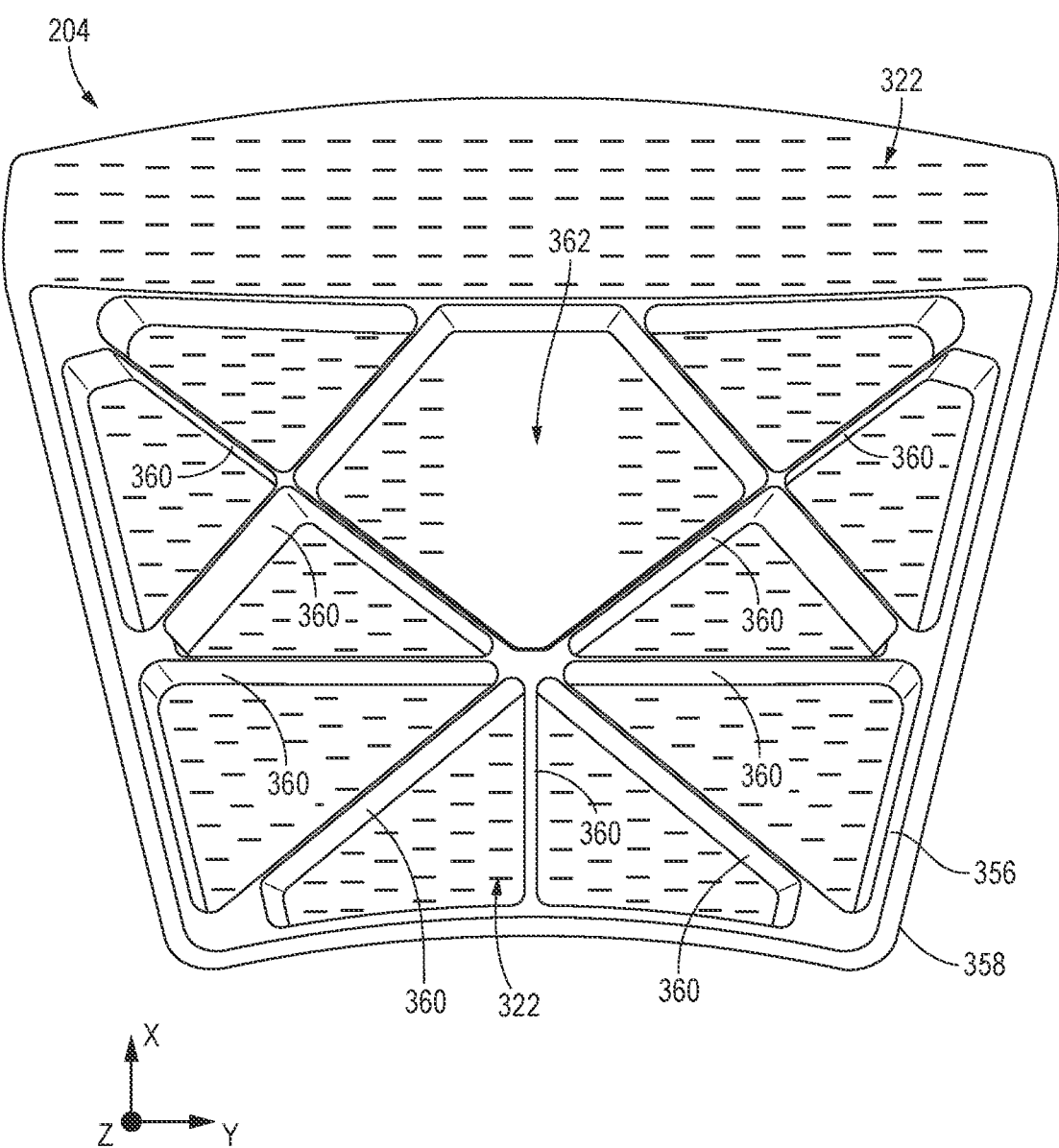
FIG. 6 is a perspective view of a side of a facesheet that confronts or faces a door body when coupled thereto, with the facesheet having a plurality of structurally-active ribs integrally formed therewith or coupled thereto, according to an example aspect of the present disclosure.

FIG. 6 is a perspective view of a side of a facesheet 204 that confronts or faces a door body when coupled thereto, with the facesheet 204 having the plurality of structurally-active ribs integrally formed therewith or coupled thereto. As shown, the facesheet 204 can include structurally-active ribs 360 and a perimeter wall 356 that is spaced from an edge 358 of the facesheet 204. The structurally-active ribs 360 and the perimeter wall 356 can define a plurality of cavities. When the facesheet 204 is coupled with a door body, an outer wall (e.g., the outer wall 224 in FIG. 2) of the door body can be arranged in the space between the perimeter wall 356 and the edge 358. In this way, the perimeter wall 356 can be positioned adjacent to the outer wall, and in some aspects, can be connected thereto, e.g., by fasteners, an adhesive, a weld, etc. A mounting base of the door body (e.g., the mounting base 232) can be arranged within a void 362 defined by the facesheet 204. The structurally-active ribs 360, the perimeter wall 356, and/or other surfaces of the facesheet 204 can engage the door body to be coupled thereto. Specifically, when the facesheet 204 is coupled with a door body, the plurality of cavities defined by the structurally-active ribs 360 arranged between the backplate and the door body and the facesheet 204 communicate with the plurality of perforations 322 to create a plurality of acoustic cells, which as noted herein, can advantageously attenuate noise.

In some alternative aspects, the outer wall of the door body to which the facesheet 204 of FIG. 6 is coupled can be omitted. In such aspects, the perimeter wall 356 of the facesheet 204 of FIG. 6 can be arranged at the edge 358 around the perimeter, and accordingly, can act as the outer wall.

Figure 7:
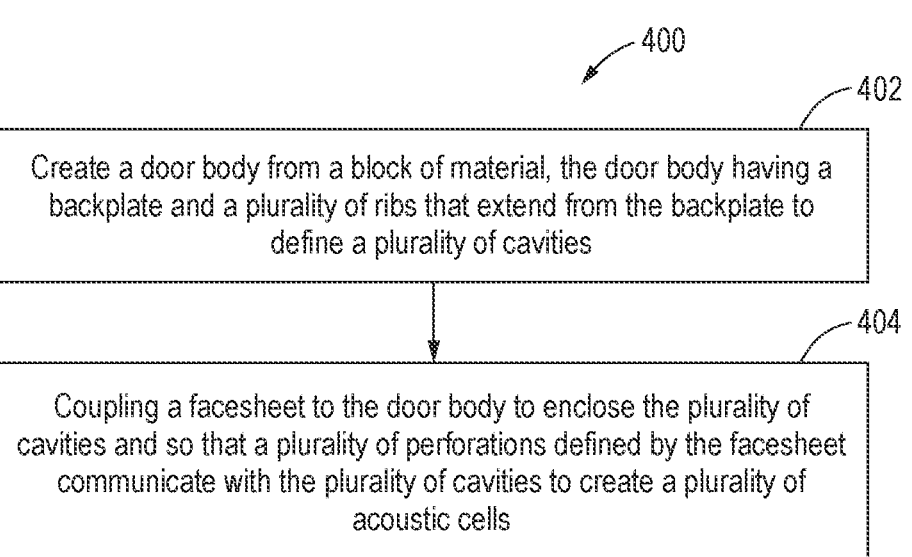
FIG. 7 is a flow diagram for a method of fabricating a blocker door according to an example aspect of the present disclosure.

FIG. 7 is a flow diagram for a method 400 of fabricating a blocker door according to an example aspect of the present disclosure.

At 402, the method 400 can include creating a door body from a block of material, the door body having a backplate and a plurality of ribs that extend from the backplate to define a plurality of cavities. For instance, a door body can be created by forming or machining (e.g., "hogging out") an aluminum block of material. The aluminum block can be machined so that the door body has a backplate and a plurality of structurally-active ribs or stiffeners extending from the backplate to define a plurality of cavities. The aluminum block can further be machined so that the door body has an outer wall extending from the backplate and at least in part around a perimeter of the door body. The outer wall can be thicker than the ribs. The aluminum block can also be machined so that the door body has a plurality of mounting structures, such as hinges and clevises, which may enable the blocker door to be coupled within a thrust reversing system of an aft duct assembly for an aircraft engine assembly. The aluminum block can be machined so that the ribs are optimally arranged to carry loads but also so that the cavities formed thereby are intelligently arranged to provide acoustic attenuation. The ribs, outer wall, and a mounting base also machined from the aluminum block can each be at a height to allow for a facesheet to be laid flat or relatively flat thereon. In at least some aspects, the aluminum block is machined so that the ribs (and in some aspects the outer wall, mounting features, mounting base, flange, etc.) are integrally formed with the backplate as a monolithic unitary component. In some alternative aspects, the door body can be additively manufactured (e.g., 3D printed) as a monolithic unitary component, or made via other materials and processes (e.g., thermoplastic forming or thermoplastic compression molding, thermoplastic injection molding, composite layup, etc.).

At 404, the method 400 can include coupling a facesheet to the door body to enclose the plurality of cavities and so that a plurality of perforations defined by the facesheet communicate with the plurality of cavities to create a plurality of acoustic cells. For instance, a facesheet can be laid over the door body and coupled thereto, e.g., by mechanical fasteners, adhesives, a combination thereof, etc. The facesheet can be shaped to fit or overlay over an entirety of the door body. The facesheet can define a plurality of perforations, such as the slotted perforations. The facesheet can be aligned with and coupled to the door body so that the facesheet encloses the cavities. The perforations can be arranged on the facesheet so that the perforations communicate with the cavities. The enclosed cavities having flow communication by way of the perforations creates the acoustic cells. The perforations allow fluid (e.g., high bypass air) to flow into and out of the acoustic cells, which provides noise attenuation. The acoustic cells of the blocker door can attenuate aft-radiating noise from an aircraft engine assembly, for example. In some implementations, one or more of the acoustic cells can be empty to allow for a volume of air to fill therein. In some implementations, one or more of the acoustic cells can include a volume of acoustic attenuating material disposed therein.

To summarize, the present disclosure provides a blocker door having multi-functional integral ribs or stiffeners that react flight/ground loads and also act to form resonance chambers for acoustic attenuation, which are closed with a perforated facesheet. In some aspects, a door body of the blocker door can be formed from one solid "chunk" of material (e.g., aluminum) with the ribs being integrally formed with a backplate as a monolithic unitary component. A carbon-fiber-reinforced polymer (CFRP) facesheet with perforations can enclose the cavities formed by the integrally formed ribs to create acoustic cells. The perforated facesheet can face into an aft fan duct flow region to attenuate aft-radiating fan noise. In other aspects, the door body can be formed of other materials, such as by a thermoplastic, as well as by other fabrication processes, such as by additive manufacturing, to obtain the desired, tailored cell volume to offset aft fan duct noise.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s).

While the foregoing is directed to aspects of the present disclosure, other and further aspects of the disclosure may be devised without departing from the basic scope thereof, and the scope thereof is determined by the claims that follow.

What is claimed is:

1. A blocker door, comprising:
a door body having a backplate;
a facesheet coupled with the door body and defining a plurality of perforations; and
a plurality of ribs arranged between the backplate and the facesheet to define a plurality of cavities that communicate with the plurality of perforations to create a plurality of acoustic cells, wherein the plurality of ribs comprises:
a first rib extending in a first direction;
a first-side aft rib angled with respect to the first rib;
a first-side central rib extending perpendicular to the first rib;
a first-side central diagonal rib arranged diagonal to the first rib; and
wherein the first rib, the first-side aft rib, the first-side central rib, and the first-side central diagonal rib intersect at a central rib juncture.

2. The blocker door of claim 1, wherein each cavity of the plurality of cavities has a length that is at least greater than ⅜ of an inch.

3. The blocker door of claim 1, wherein the blocker door defines a midline that separates the blocker door into a first side and a second side, wherein the first rib is a central-aft rib extending along the midline, and wherein the plurality of ribs comprises:
a second-side aft rib angled with respect to the midline,
a second-side central rib extending perpendicular to the midline, and
a second-side central diagonal rib arranged diagonal to the midline, and
wherein the second-side aft rib, the second-side central rib, and the second-side central diagonal rib intersect at the central rib juncture.

4. The blocker door of claim 3, wherein the door body has an outer wall that extends from the backplate and along at least a portion of a perimeter of the door body, and
wherein the central-aft rib, the first-side aft rib, the second-side aft rib, the first-side central rib, the second-side central rib, the first-side central diagonal rib, and the second-side central diagonal rib each respectively connect to the outer wall.

5. A blocker door, comprising:
a door body having a backplate;
a facesheet coupled with the door body and defining a plurality of perforations; and
a plurality of ribs arranged between the backplate and the facesheet to define a plurality of cavities that communicate with the plurality of perforations to create a plurality of acoustic cells;
wherein the door body has a hinge extending from the backplate in a direction opposite the plurality of ribs, and wherein the backplate defines a hinge recess in which the hinge is positioned, and
wherein the door body includes a flange extending from the backplate, a mounting base, an outer wall, and wherein the plurality of ribs includes a partition rib and a hinge rib that extends between and connects the flange and the mounting base.

6. The blocker door of claim 5, wherein the flange, the partition rib, the hinge rib, and the outer wall define a hinge cavity, which is one of the plurality of cavities, and wherein the hinge cavity mirrors the hinge recess along a thickness direction of the blocker door, and wherein the hinge cavity has a portion that gradually increases in depth as the hinge cavity extends toward an end of the blocker door.

7. The blocker door of claim 1, wherein the door body includes a flange extending from the backplate and a mounting base that has one or more mounting structures, and wherein the plurality of ribs includes a first-side hinge rib and a second-side hinge rib that each extend between and connect the flange and the mounting base, and wherein the plurality of cavities includes a central forward cavity defined by the flange, the mounting base, the first-side hinge rib, and the second-side hinge rib.

8. The blocker door of claim 1, wherein the door body has an outer wall that extends from the backplate and along at least a portion of a perimeter of the door body, and wherein the door body includes a mounting base that includes one or more mounting structures, and wherein the plurality of ribs includes a central diagonal rib and a forward diagonal rib that each extend at an angle with respect to a midline of the blocker door and each extend perpendicular to one another, the central diagonal rib and the forward diagonal rib intersect at a rib juncture and each extend between and connect to the outer wall and the mounting base.

9. The blocker door of claim 1, wherein the blocker door has a forward end and an aft end and defines a midline that separates the blocker door into a first side and a second side, wherein the door body has an outer wall that extends from the backplate and along at least a portion of a perimeter of the door body, and wherein the door body includes a mounting base that includes one or more mounting structures, and wherein the plurality of ribs includes a first-side forward diagonal rib and a second-side forward diagonal rib, the first-side forward diagonal rib is arranged on the first side and extends between and connects to the outer wall and the mounting base, the second-side forward diagonal rib is arranged on the second side and extends between and connects to the outer wall and the mounting base, the first-side forward diagonal rib and the second-side forward diagonal rib converge toward one another as they extend toward the forward end.

10. The blocker door of claim 1, wherein the door body includes a mounting base that includes one or more mounting structures, and wherein the plurality of cavities includes a forward inner cavity defined by the mounting base, and a central diagonal rib and a forward diagonal rib of the plurality of ribs, and wherein the mounting base has a stepped sidewall that steps the mounting base inward toward a midline defined by the blocker door.

11. The blocker door of claim 1, wherein the blocker door defines a midline separating the blocker door into a first side and a second side, and wherein the plurality of ribs are arranged so that:

at least two ribs of the plurality of ribs intersect at a first-side rib juncture on the first side of the blocker door, at least at least two ribs of the plurality of ribs intersect at a second-side rib juncture on the second side of the blocker door, and at least two ribs of the plurality of ribs intersect at a central rib juncture arranged coplanar with the midline.

12. The blocker door of claim 1, wherein an average volume of the acoustic cells ranges between 7 and 9 cubic inches.

13. The blocker door of claim 1, wherein the plurality of acoustic cells include ten to sixteen acoustic cells.

14. The blocker door of claim 1, wherein at least one of the plurality of acoustic cells is empty to allow for a volume of air to fill therein.

15. The blocker door of claim 1, wherein at least one of the plurality of acoustic cells has a volume of acoustic attenuating material disposed therein.

16. The blocker door of claim 1, wherein the ribs are integrally formed with the backplate as a monolithic unitary component.

17. An aft fan duct assembly, comprising:
an inner duct wall;
an outer duct wall, the inner duct wall and the outer duct wall defining a fan duct;
blocker doors arranged within the fan duct and each movable between a stowed position and a deployed position, and wherein each one of the blocker doors comprises:
a door body having a backplate;
a plurality of ribs that extend from the backplate to define a plurality of cavities, wherein the plurality of ribs includes a set of ribs that intersect at a rib juncture, wherein a first rib of the set of ribs extends in a first direction, a second rib of the set of ribs extends perpendicular to the first direction, and a third rib of the set of ribs extends diagonally between the first rib and second rib; and
a facesheet coupled with the door body, wherein the facesheet encloses the plurality of cavities and defines a plurality of perforations that communicate with the plurality of cavities to create a plurality of acoustic cells.

18. The aft fan duct assembly of claim 17, wherein the first rib of the set of ribs extends along a midline defined by the blocker door.

19. The aft fan duct assembly of claim 17, wherein a first blocker door of the blocker doors defines a midline separating the first blocker door into a first side and a second side, and wherein the plurality of ribs are arranged so that:
at least two ribs of the plurality of ribs intersect at a first-side rib juncture on the first side of the first blocker door,
at least two ribs of the plurality of ribs intersect at a second-side rib juncture on the second side of the first blocker door, and
at least two ribs of the plurality of ribs intersect at a central rib juncture arranged coplanar with the midline.

20. A method of fabricating a blocker door, comprising:
creating a door body from a block of material, the door body having a backplate and a plurality of ribs that extend from the backplate to define a plurality of cavities, wherein the plurality of ribs comprises:
a first rib extending in a first direction;
a first-side aft rib angled with respect to the first rib;
a first-side central rib extending perpendicular to the first rib;
a first-side central diagonal rib arranged diagonal to the first rib; and
wherein the first rib, the first-side aft rib, the first-side central rib, and the first-side central diagonal rib intersect at a central rib juncture; and
coupling a facesheet to the door body to enclose the plurality of cavities and so that a plurality of perforations defined by the facesheet communicate with the plurality of cavities to create a plurality of acoustic cells.

* * * * *